United States Patent [19]

Millard

[11] Patent Number: 5,433,358
[45] Date of Patent: Jul. 18, 1995

[54] TRIPODS

[76] Inventor: Trevor Millard, 28 Poole Street, Norton, Stourbridge, West Midlands, DY8 3AU, England

[21] Appl. No.: 128,604

[22] Filed: Sep. 29, 1993

[30] Foreign Application Priority Data

Sep. 6, 1993 [GB] United Kingdom ............... 9318441

[51] Int. Cl.⁶ .................................................. A45F 4/02
[52] U.S. Cl. ........................................ 224/153; 224/151; 224/210; 224/209
[58] Field of Search ............... 224/151, 153, 154, 155, 224/210, 209; 248/163.1, 165, 172, 440.1; 354/293; D16/244, 245

[56] References Cited

U.S. PATENT DOCUMENTS

| | | | |
|---|---|---|---|
| 1,799,540 | 4/1931 | Turner | 248/175 X |
| 2,031,119 | 2/1936 | Moreland | 224/155 X |
| 2,463,655 | 3/1949 | Temple, Jr. | D16/244 |
| 2,519,549 | 8/1950 | Coutant et al. | D16/244 |
| 3,493,153 | 2/1970 | Spady et al. | 224/153 X |
| 3,984,115 | 10/1976 | Miller | 224/153 |
| 4,362,307 | 12/1982 | Nakatani | 224/153 X |
| 4,697,772 | 10/1987 | Kosugi et al. | D16/244 |

FOREIGN PATENT DOCUMENTS

| | | |
|---|---|---|
| 1401240 | 7/1975 | United Kingdom . |
| 2023413 | 1/1980 | United Kingdom . |
| 2095544 | 10/1982 | United Kingdom . |
| 2214432 | 9/1989 | United Kingdom . |

Primary Examiner—J. Casimer Jacyna
Assistant Examiner—David J. Walczak
Attorney, Agent, or Firm—Leydig, Voit & Mayer, Ltd.

[57] ABSTRACT

A carrier comprises a support frame and a carrying harness. The frame is an A-frame which has two telescopic legs at each side. A third telescopic leg is pivotable with respect to the frame. The carrier is adapted to carry a bag, for example a camera equipment bag, and the combination may be worn by a user as a rucksack. In use the telescopic legs are extended, the third leg is pivoted away from the frame and the carrier forms a tripod. At the top of the tripod is a mounting block which may mount a camera or a tripod head.

6 Claims, 4 Drawing Sheets

TRIPODS

This invention relates to tripods and particularly but not exclusively to tripods used in photography.

Tripods are widely used in photography to provide a steady mounting for cameras. If a tripod is used indoors it is relatively easy to transport. Generally the legs of a tripod may be pivotally attached to a pivot point and all the legs may be brought together to fold the tripod into a more compact arrangement. However even when the tripod is folded in this manner it is still quite long and relatively unwieldly to carry. In the confines of a building this does not present great difficulties but if the tripod is to be used outdoors this can be a problem. The user of a tripod will also carry equipment such as cameras, lenses, filters, light meters and other equipment which together weighs a great deal. It is common for the instruments to be contained in a bag carried over one shoulder and the tripod to be carried over the other shoulder. Sling arrangements are known which may be attachable to each end of a tripod to provide an over-the-shoulder strap.

Once a photographer has reached a location of interest he must then unload himself of all of the equipment and lay it down in order that the tripod and the photography equipment may be set up. A shoulder bag containing the equipment, or the equipment itself, may need to be placed on wet ground. During photography the photographer will have to reach down frequently to retrieve equipment, such as lenses, from the bag and will need also to replace it in the bag. Once the photography is finished and the equipment is packed away, the tripod and the equipment bag each have to be swung over a shoulder of the photographer.

The difficulties involved in carrying such a folded tripod are particularly acute when the photographer is travelling by foot to inaccessible locations such as hills, mountains or other terrain which is generally impassable to land vehicles.

These problems are not exclusively encountered by photographers. Birdwatchers may wish to use a tripod and binocular or telescope combination. Surveyors also must use tripod mounted equipment. In each case it does become necessary from time to time for tripods and attendant equipment to be transported by foot to preferred locations. Therefore the scope of the invention is not limited exclusively to tripods to be used in photography but to tripods generally irrespective of their use.

It is an aim of the present invention to alleviate some of the difficulties discussed herein.

According to a first aspect of the invention I provide a carrier which is adapted to be converted into a tripod.

Preferably the carrier is adapted to be worn on the back of a user. The carrier is preferably a frame.

Alternatively the invention may be considered as a tripod which may be adapted for use as a carrier for bags or equipment.

Yet another way of looking at the invention is that it is a carrier which is provided with telescopic legs which are adapted to support the carrier above the ground.

Therefore the user does not have to carry a tripod separately from the rest of his equipment. The carrier may carry bags/and or equipment. The bags or equipment may be for use in photography.

For the sake of convenience we use the term tripod. However it is envisaged that the invention may apply to equipment support stands having a number of legs other than three. A four legged stand is envisaged or a one or two legged stand which may be supported by large feet provided at the end of legs, or by spikes which may be driven into the ground. Alternatively the leg or legs provided may be adapted to co-operate with another piece of equipment, for example a base plate, with which it forms a stand.

Preferably the carrier is mountable onto the back of a user. This enables the carrier and tripod to be mounted on the back of a user thus freeing both of his hands. Therefore the user's hands are free to negotiate any obstacles encountered on the way to a preferred location, for example fences and stiles.

Preferably the carrier provides a support frame which may support other items. The support frame may be adapted to receive a bag.

Preferably the carrier comprises an A-frame arrangement with a leg which is pivotable thereto. A leg may be provided on each side of the A-frame.

Preferably one or more of the legs of the carrier may be extendable from a first stowed position when the carrier is used as a back-pack to a second extended position when it is converted into a tripod. Most preferably the legs of the carrier are telescopic.

Preferably the carrier comprises a harness and a frame. Preferably the harness and the support frame are attachable to one another. The harness may be adapted to be worn on the back of a user. The harness may comprise two shoulder straps of material attached to the support frame. Back padding may be provided to fit between the back of a user and the carrier and the support frame.

Preferably the carrier is provided with three legs. Preferably two of the legs of the carrier are in fixed relation to each other and a third leg is pivotable thereto. The third leg may pivot at a point located between the two fixed legs. The third leg may pivot on a cross beam attached to each of the two fixed legs.

A mounting block may also be provided which is pivotally mounted with respect to the legs of the carrier. The mounting block may be able to pivot freely with respect to the legs of the carrier and the support frame. The mounting block is preferably adapted to receive a tripod head which is capable of connecting a camera or other article of equipment to the tripod.

Preferably the third leg is adapted to pivot such that, in one position, it is capable of lying in substantially the same plane as that of the support frame. The support frame may, for example, consist of two convergent tubes connected to each other by an upper cross member, in the region of their upper ends where the tubes are closest. The tubes may also be joined at a lower point by a middle cross member and at a lowest point by a lower cross member. The third leg may be pivotally attached to the upper cross member. The mounting block may be pivotally attached to the upper cross member. The middle and lower cross members may be non-straight, for example they may be kinked, such that the third leg may be pivoted such that it lies in substantially the same plane as the first and second legs. In this way the carrier legs may be folded into a compact arrangement.

According to a second aspect of the invention I provide a method of converting a carrier into a tripod comprising the steps of a user wearing the carrier on his back, releasing one or more telescopic legs until the carrier is supported by one or more legs in contact with the ground, and the user removing the carrier from his back.

Preferably the method includes the step of releasing an additional telescopic leg once the user has removed the carrier. Thus the carrier may then be self-standing on the three telescopic legs and is a tripod.

Preferably the carrier is in accordance with the first aspect of the invention.

According to a third aspect of the invention I provide a frame adapted to be worn on the back of a person, the frame being convertible into a tripod.

An embodiment of the invention will now be described by way of example only in which.

Figure 1:
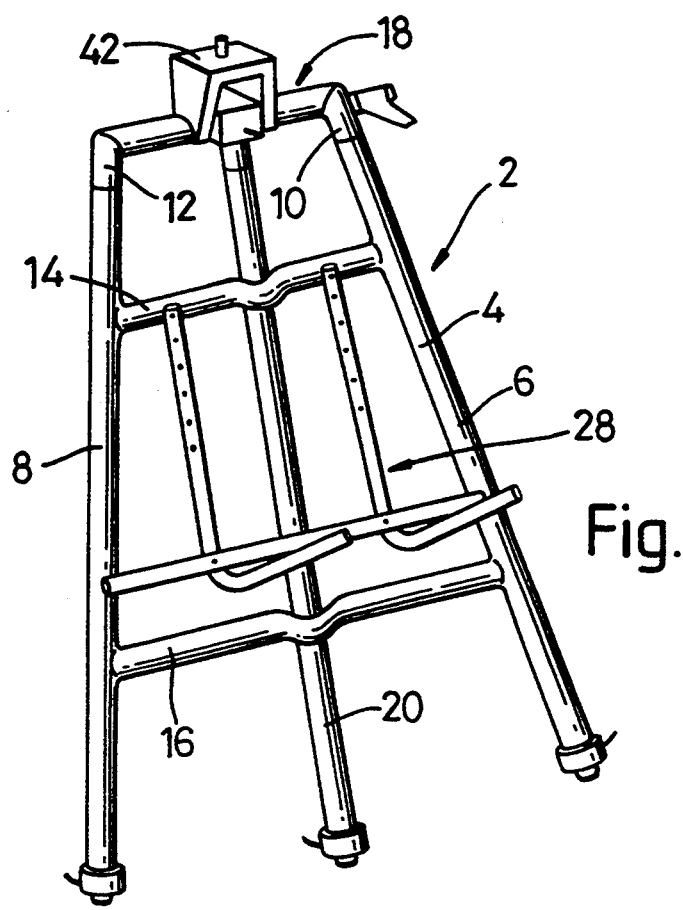
FIG. 1 shows a perspective view of the carrier, or frame.

Referring to FIG. 1 a carrier 2 according to the invention comprises a fixed frame 4 comprising two longitudinal members or legs 6, 8 which converge towards their upper ends 10, 12 respectively. The longitudinal members are fixed together by transverse cross members 14, 16 and 18.

A third longitudinal member or leg 20 is provided which is pivotally attached to the transverse cross member 18. In FIG. 1 the leg 20 is shown lying substantially in the same plane as member 6, 8, 14, 16 and 18. A bag carrying frame 28 is provided which is attachable to one or more of the longitudinal and transverse members. The frame 28 is removable from the fixed frame 4. Alternatively the frame 28 may be omitted and may simply be a shelf arrangement comprising a C-shaped element lying in a substantially horizontal plane when the carrier is upright joined at each end to each leg 6, 8. The upper part of the frame comprised of elements 52, 54, 56, 58 and 14 may be an integrally cast or formed piece.

Figure 2:
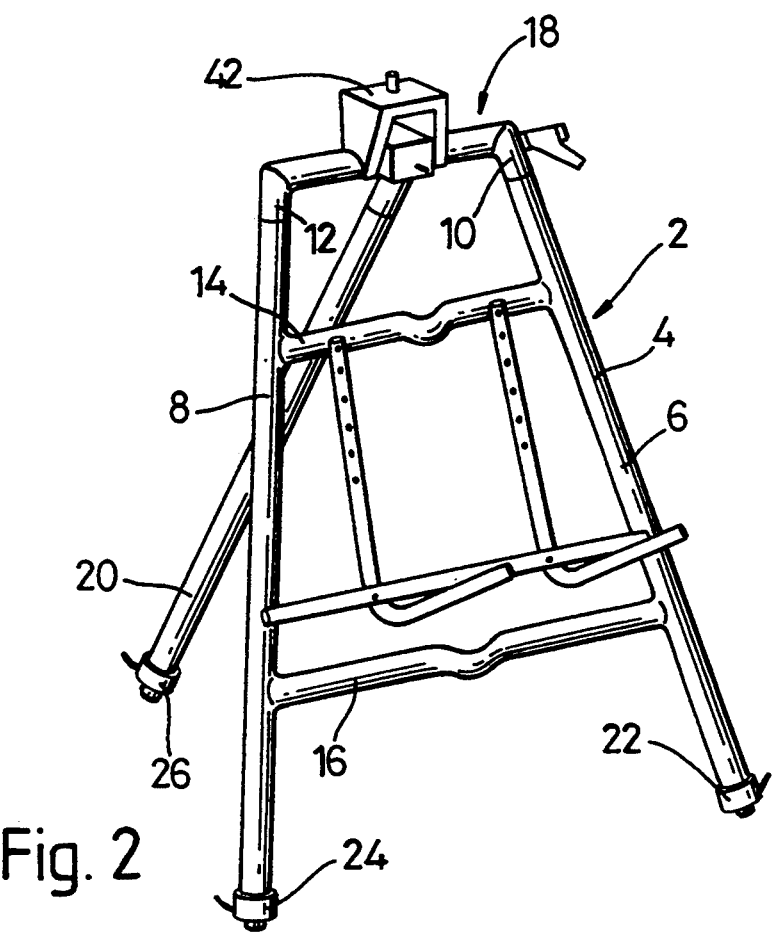
FIG. 2 shows a perspective view of the carrier having one pivotable leg projecting outwardly.

FIG. 2 shows a similar view of the carrier in which the leg 20 has been pivoted such that its lower end is displaced out of the plane of the other members. It will be seen that the carrier now forms a tripod arrangement.

Each leg 6, 8 and 20 is telescopic. At the end of each leg 6, 8 and 20 a locking mechanism 22, 24 and 26 is provided which is capable of exerting a compressive loop force around the leg. This serves to lock the legs and an inner telescoping member provided in each leg into a fixed relationship with one another.

Figure 3:
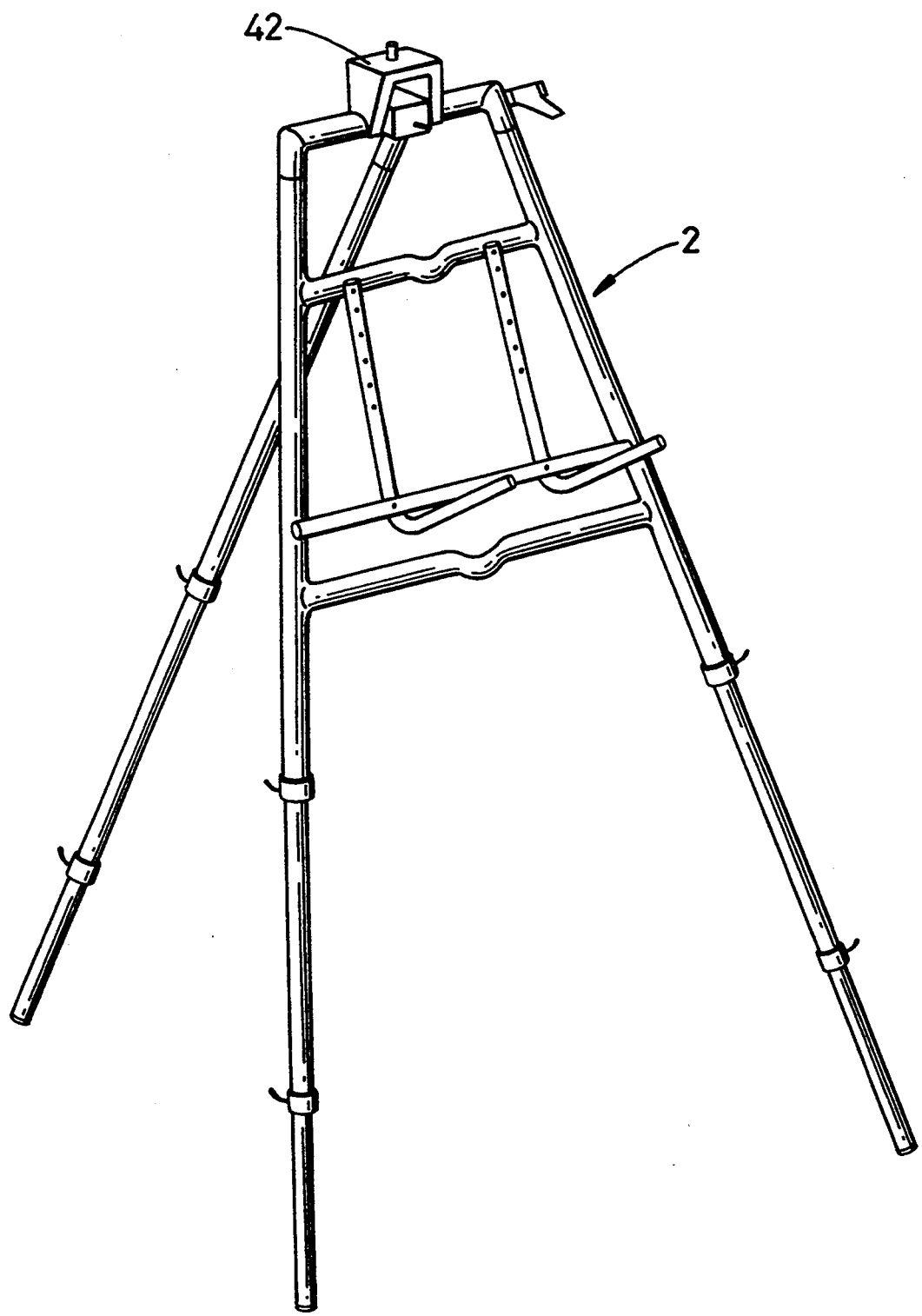
FIG. 3 shows a perspective view of the carrier converted into use as a tripod.

FIG. 3 shows the telescopic legs of the carrier 2 fully extended and locked into position. Whilst it is favoured to provide a two piece telescopic leg as described above, more segments to the legs may be provided as is shown in this Figure to provide legs which are capable of telescoping to a greater length.

Figure 4:
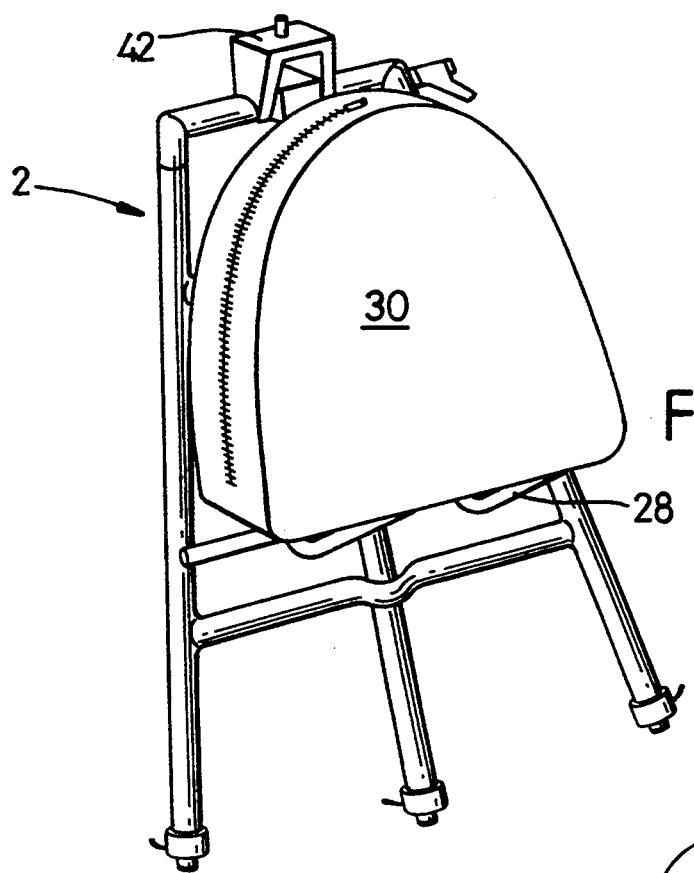
FIG. 4 shows a bag mounted on the carrier of FIG. 1.

FIG. 4 shows a bag attached to the carrier 2 by means of the bag carrying frame 28.

Back padding 32 is provided at the back of the carrier to make the wearing of it more comfortable. The padding 32 is located between the back of the user and the carrier. Whilst the carrier is worn the third leg 20 is maintained in a folded up position next to the fixed frame 4. However, once the carrier 2 is to be converted into a free-standing tripod the third leg 20 must be displaced away from the fixed frame 4 as shown in FIG. 2. For this reason the back padding 32 is comprised of two pieces of padded material which are attachable by complementary strips of velcro provided on each. When the pieces are joined the two pieces form an overall piece of material. However they may be separated in order to allow the third leg 20 to pass through. The back padding is only indicated in FIG. 5 for convenience.

Figure 5:
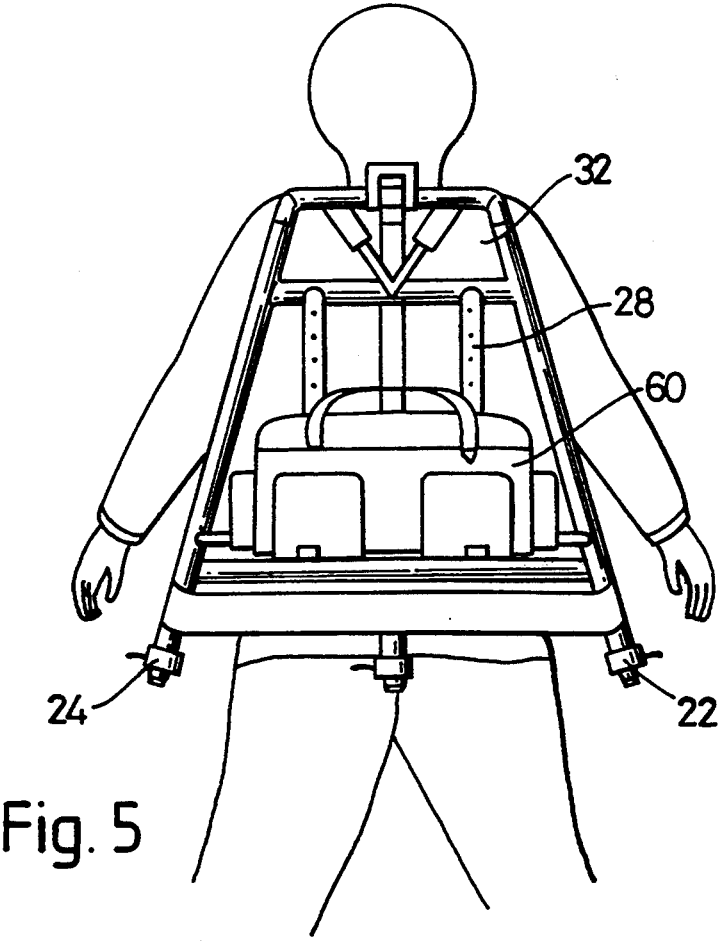
FIG. 5 shows a rear elevation of the carrier whilst being worn by a user.

In use the carrier 2 is worn on the back of a user as is shown in FIG. 5. This figure shows details of the carrier 2 having a harness. Shoulder straps pass over both shoulders and a waist belt which is attachable across the stomach is also provided. The waist belt may be detachable and may be provided with pouches to contain equipment. The carrier 2 can carry a bag 30 which is especially provided for the carrier as shown in FIG. 4 or it can carry a more conventional camera bag 60 as shown in FIG. 5 which is shown secured onto the bag carrying frame 28. Therefore in this arrangement the user may carry both his tripod and his camera equipment in a bag such that the bag and the tripod are secured together firmly on the back of a user.

The user carries the carrier 2 to a location, say a mountain, at which he would like to take photographs. Once a suitable location is found the user releases the locking mechanisms 22 and 24 such that the legs telescope and come into contact with the ground. The legs may not actually contact the ground but may extend such that they are near the ground. The legs may fall out themselves once the locking mechanisms 22 and 24 are released or may be fed out by the user himself. They may even be spring biased outwards.

Once the legs are fully extended and locked the user removes the carrier from his back. Since the carrier has legs which are extending from it, the user does not have to lower a camera bag until the bag itself is in contact with the ground but may lower the carrier a small amount, if the legs are already not in contact with the ground, such that it is supported at an appropriate height by the legs. Accordingly the user then simply steps out of the carrier harness whilst the carrier frame and bag 30, 60 is supported above the ground. Furthermore the bag 30, 60 itself does not have to be brought into contact with the ground.

The user then supports the carrier with one hand whilst he frees the third leg from its position of resting against the fixed frame 4 behind the back padding 32. The leg is pivoted out of the plane of the fixed frame and the locking mechanism 26 is released thus enabling the leg 20 to telescope. Once the leg is fully extended it is locked again with the locking mechanism and the tripod is an arrangement similar to that shown in FIG. 3. It should be noted that since the bag 30, 60 which may contain equipment will already be fixed onto the tripod, it will serve as a stabilising weight. Thus the need to provide other stabilising weights such as bags of sand is either much reduced or obviated.

Figure 7:
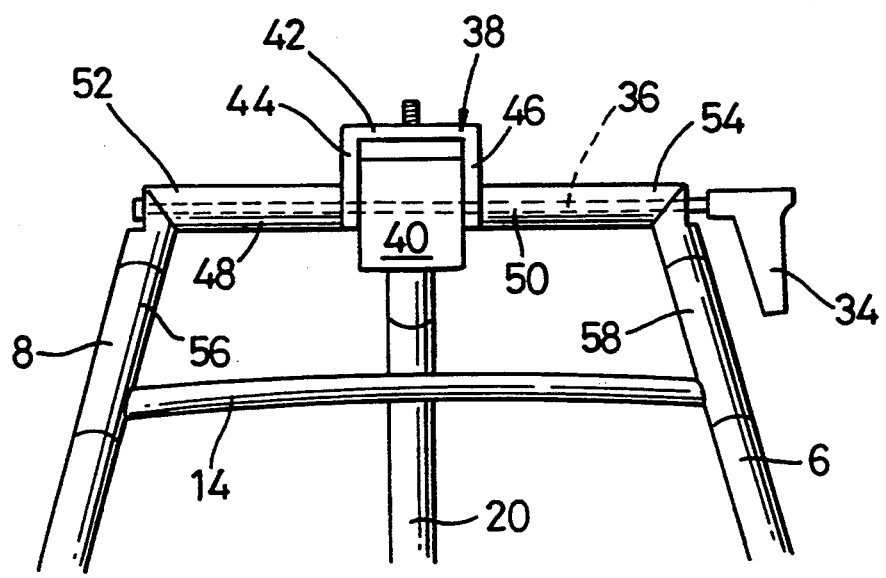
FIG. 7 shows a partial view of a top part of the carrier.

The third leg 20 is restrained against pivotal movement as shown in FIG. 7. A locking handle 34 and co-operating rod arrangement 36 are located at the top of the fixed frame 4. The rod runs through the top ends 10, 12 of the legs 6, 8 and through the transverse member 18. The rod 36 also runs through a mounting block 38 and a pivoting block 40 at the top end of the third leg 20. The mounting block 38 is comprised of a top plate 42 having two depending flanges 44, 46 extending therefrom. Each flange has a pivotal hole in its side. The pivoting block 40 also has a hole, which runs through it from one side to another, which registers with the holes in the flanges. The rod 36 passes through all three holes. If the handle 34 is operated to tighten the rod arrangement 36, respective parts of the cross transverse member 18, parts 48 and 50, are caused to apply a compressive force to either side of the mounting block 38 which in turn applies a compressive force to the pivoting block 40. Therefore the assembly of parts 48,50, mounting block 38 and pivotal block 40 may be locked in one simple movement of the locking handle 34. Once the handle 34 is fully tightened the mounting block 38 and the pivoting block 40 are held against movement. Therefore the leg 20 is also held in place and the tripod is formed with all three legs locked in place. The area of contact between the pivoting block and mounting block may be provided with serrations to give further resistance to relative movement between these parts. The serrations may be provided on either block or both.

The mounting block is free to move pivotally (when the locking handle 34 is slackened) in relation to the tripod and is capable of adopting a position in which a camera mounted thereon may be looking straight up or straight down. A pivoting mounting block provides additional freedom of movement to a camera to that provided by a tripod head. The locking handle arrangement may be such that it can be slackened to a first condition in which the head can be moved, but the legs are still rigid, and a second condition in which the legs and the head are free to move.

The user is then presented with a tripod supporting his equipment bag 30,60 at a height which is convenient for accessibility. The bag 30,60 does not have to be put into contact with the ground nor is it left at a height that is difficult to reach.

The pivoting block and leg are adapted to move around the threaded rod by nearly 360°. Accordingly if the third leg 20 is pulled away from the fixed frame and pivoted through approximately 330°, the bag 30,60 will be disposed in a space surrounded by the three legs, and thus protected.

Figure 6:
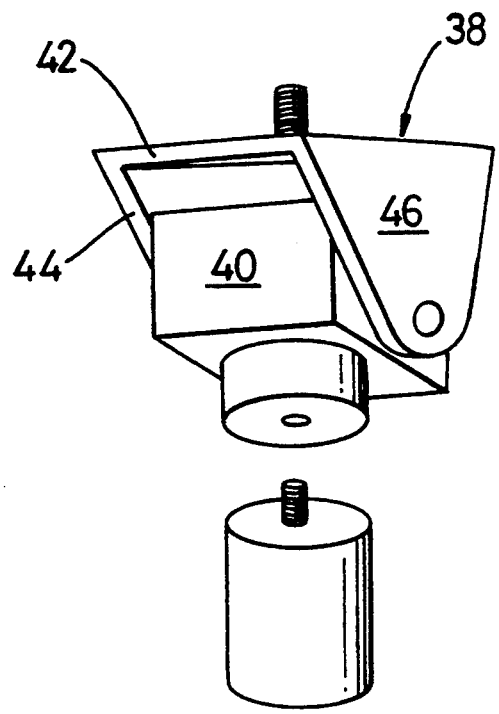
FIG. 6 shows a close-up view of part of the carrier.

FIG. 6 shows a further feature of the invention. Although it is possible to have the leg 20 and the pivoting block 40 as an integral unit, it is preferred to have a screw connection between them such that the leg 20 is detachable from the block 40. It is thus possible to remove the leg 20 from the folded carrier or from the tripod and then to convert the tripod into a carrier which can be worn as a back-pack. In this way the detached leg 20 may serve as a monopod to provide support for a camera. The leg 20 may serve as a walking stick if the user wishes to travel with his equipment to an especially inaccessible location by foot. The upper end of the leg 20 is provided with a screw threaded rod. This is the same diameter as that on the mounting block and consequently a head may be screwed directly onto the legs. Alternatively the screw threaded rod may be of a diameter to screw directly into a camera body.

Once the user has finished using the tripod, he simply pushes the leg 20 into a retracted, non-telescoped, position, and folds the leg back behind the back padding 32. Alternatively, in accordance with the preceding paragraph he may simply unscrew the leg 20 from the pivoting block 40 for use as a walking aid or as a monopod. The user then steps into the carrier which is still supported by two legs 6,8 and supports the carrier on his back by means of the harness. The locking mechanisms 22,24 are released and the telescoped legs may be retracted. Then the locking mechanisms are re-applied to prevent the legs from extending. During this procedure the bag 30,60 has remained at a substantially similar height, well above, and not in contact with the ground. The user has not had to pick up a bag from the ground and swing it over a shoulder. Consequently there has been no risk of damage to equipment or lifting strain on the part of the user.

It is to be noted that the leg 20 is moveable through a large turning circle with respect to the fixed frame 4. Also the legs 6, 8, 20 are telescopic. Thus by providing a large (up to 180°) included angle between the legs 6, 8 and the leg 20, and adjusting the leg lengths to a suitable extent, the tripod may be adjusted so that the camera mounting block 38 is very close to the ground. Because the camera mounting block 38 is moveable independently of the transverse member 18, the camera may be maintained in a horizontal attitude.

I claim:

1. A carriable structure adapted for conversion into a tripod for supporting optical equipment comprising a frame having first and second tripod legs secured in fixed angular relation to each other in a common plane; a third leg; means supporting said third leg for pivotal movement relative to said frame between a stored transport position in adjacent relation to said frame and an outwardly pivoted operative position in angular relation to the plane of said first and second legs whereby said first, second, and third legs define a tripod for supporting said carriable structure on the ground; said first, second, and third legs each being longitudinally extendable and retractable; means for securing said first, second, and third legs in extended positions for establishing a desired height of said carriable structure; a mounting head pivotally secured to said frame and adapted to releasably mount optical equipment thereon; means for securing said mounting head at a desired pivoted position with respect to said frame; and shoulder straps connected to said frame for enabling a user of the carriable structure to retain and transport the carriable structure on his back with the legs thereof in retracted position.

2. A carriable structure according to claim 1, wherein said mounting head is provided with a screw-threaded projection adapted to be screwed into a screw-threaded socket of a camera.

3. A carriable structure according to claim 1, wherein said mounting head is pivotable relative to said frame, in use, about a generally horizontal axis.

4. A carriable structure according to claim 1 wherein said third leg is angularly movable through an angle greater than 180° with respect to said frame.

5. A carriable structure according to claim 1 wherein said frame has a kinked portion disposed out of the plane of said first and second legs for defining a recess, and said third leg is received in said recess when in its stored position.

6. A carriable structure according to claim 1 wherein said frame includes support means for carrying a bag.

* * * * *